Sept. 12, 1939.  W. KARRER  2,172,708
THERMAL POWER PLANT
Filed June 25, 1936  4 Sheets-Sheet 1

Inventor
Werner Karrer
By B. Singer
Attorney

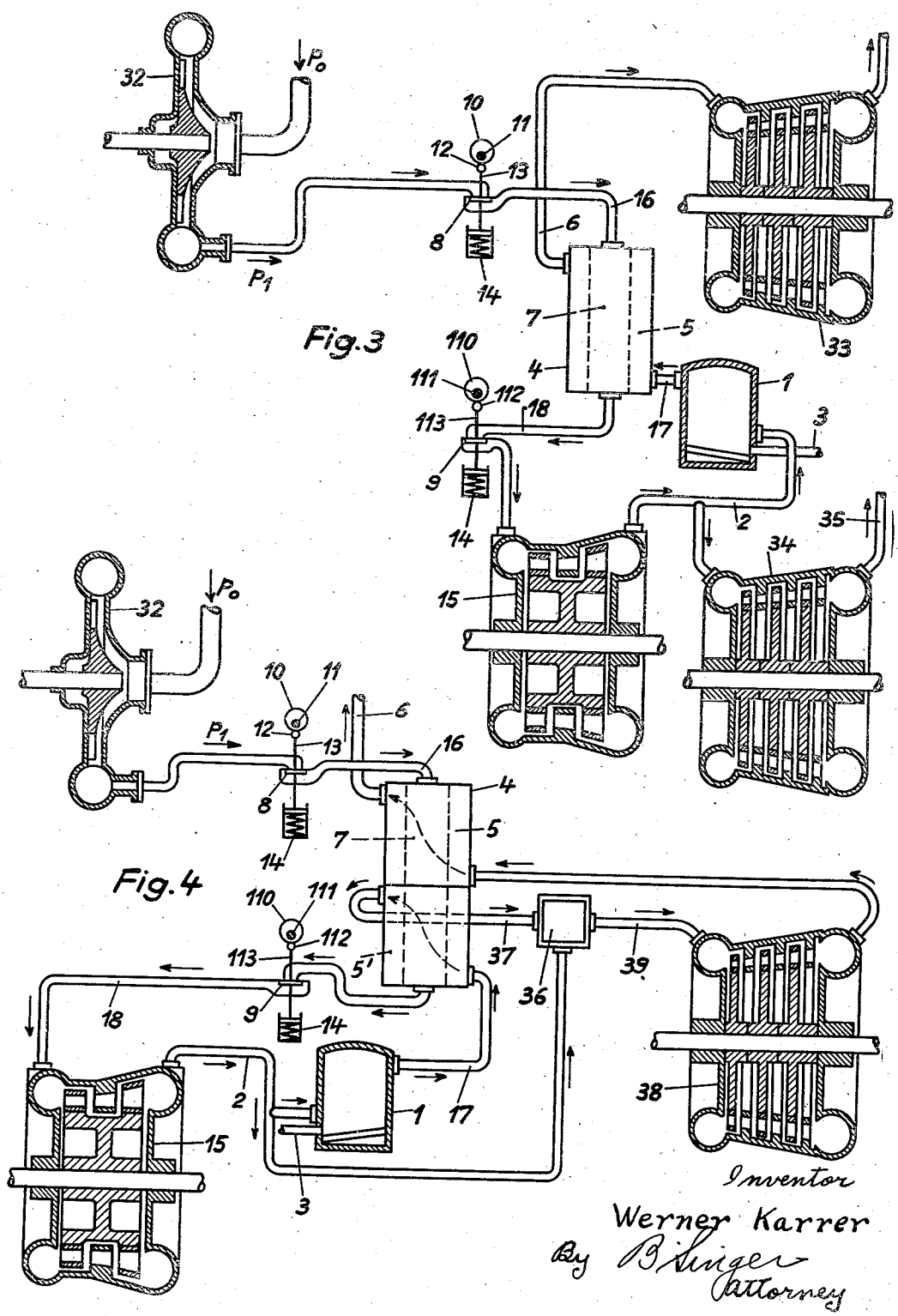

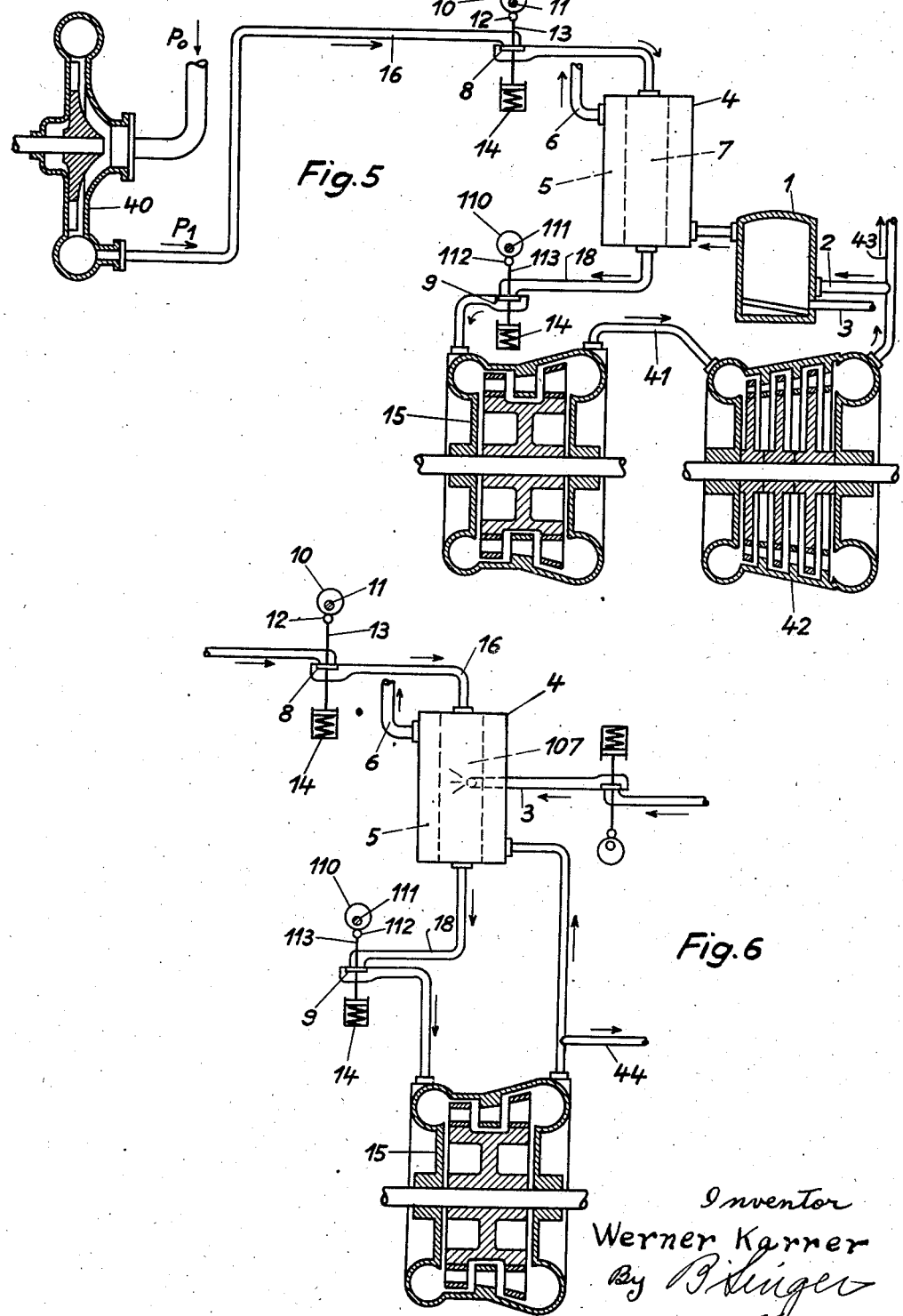

Sept. 12, 1939.  W. KARRER  2,172,708
THERMAL POWER PLANT
Filed June 25, 1936  4 Sheets-Sheet 4

Inventor
Werner Karrer
By B. Singer
Attorney

Patented Sept. 12, 1939

2,172,708

UNITED STATES PATENT OFFICE 2,172,708

THERMAL POWER PLANT

Werner Karrer, Zurich, Switzerland

Application June 25, 1936, Serial No. 87,290
In Switzerland July 1, 1935

6 Claims. (Cl. 60—59)

The present invention has for its object a thermal power plant which by the use of rotary power engines provides efficiencies substantially superior to the efficiencies of rotary power plants which are known at the present time.

For this purpose, at least a part of the pressure is generated by heating the power medium, for instance air or another gas while maintaining the volume constant. When a predetermined pressure has been reached, the medium is fed to a rotary engine where it performs work. In order to obtain the high efficiency, it is furthermore essential that at least a portion of the exhaust heat of the power engine is transferred to the power medium in a constant volume chamber by heat exchange.

The invention therefore has for an object to provide a plant which will operate in such a manner that some space or chamber is supplied intermittently with a power medium in such a manner that said space or chamber receives the heat exchange from the outside while it is shut off, so that the power medium contained in said space or chamber is thereby subjected to an increase in pressure as well as temperature; when the power medium has obtained a predetermined pressure, it is discharged or at least partly discharged to a rotary power machine where it is converted into mechanical energy. This cycle of operations: intermittently charging a chamber, effecting the heat exchange and discharging the material from the chamber is repeated at a desired frequency, by means of valves controlling the filling and emptying of said chamber.

The entire device effecting the heat exchange between the heat emitting carrier and that medium which is to be heated while its volume is to be maintained constant, shall be called hereinafter heat exchanger.

The combustion always takes place in a preferred construction of the invention after preheating, insofar as warm exhaust air of the machines is used directly as combustion air or warm exhaust air is used as fuel. The combustion is carried out under constant volume and the material is preferably preheated by heat exchange and in the step at least a portion of the heat loss may also be transferred. After the material to be burned has attained a predetermined pressure and a predetermined temperature, it is ignited and burned. This ignition and combustion may again increase the pressure as well as the temperature before the expansion in the turbine itself takes place.

A compressor may be added for the purpose of pre-compressing mechanically that power medium which is to be charged into the heat exchanger and the pressure-drop corresponding to the precompression may be effected in a separate power engine which is charged continually.

It is also quite possible to mix a plurality of power mediums. Intermediary heating or withdrawal of heat also is feasible. The heat for instance may be withdrawn at various points of the entire plant for heating purposes or working purposes, or it may be withdrawn for being surrendered to a steam power system.

Other objects of the invention will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 3 is a view, similar to Figs. 1 and 2, of a third embodiment of the invention.

Fig. 4 is a view, similar to Figs. 1, 2 and 3, of a fourth embodiment of the invention.

Fig. 5 is a view, similar to Figs. 1, 2, 3 and 4, of a fifth embodiment of the invention.

Fig. 6 shows another embodiment of my invention.

Figure 1:
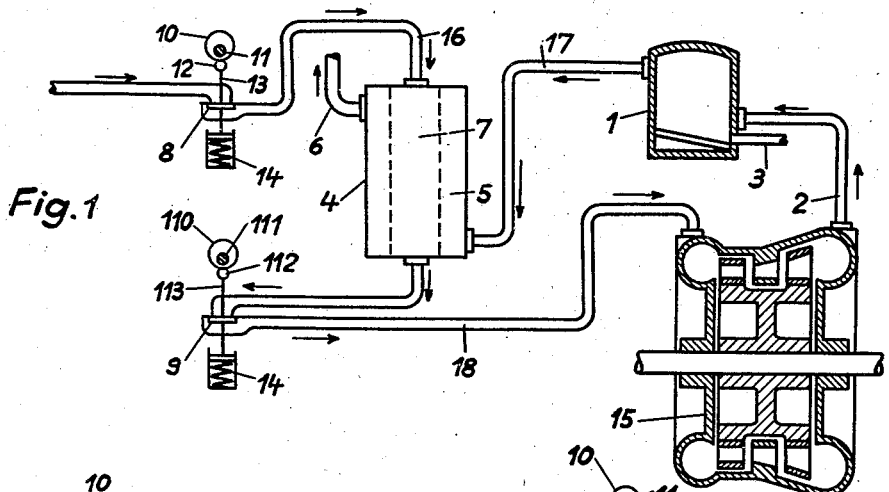
Fig. 1 is a view, largely diagrammatic and partly in section, of one embodiment of the invention.

In Fig. 1, 1 indicates the combustion chamber. Air is introduced into this chamber through the conduit 2, fuel through the pipe 3. The combustion gases flow through a conduit 17 to the heat exchanger 4 and pass within this exchanger through the chamber 5, leaving it by the pipe 6. The gases pass about at least a portion of that closed space or chamber 7. The chamber 7 is intermittently closed and opened by the valves 8 and 9 respectively.

Both the valves 8 and 9 can be actuated in any manner, known per se, for instance, by cams 10 and 110 driven by shafts 11 and 111, and acting upon the rollers 12 and 112 mounted on the shafts 13 and 113 of valves 8 and 9 respectively. Air is fed to the chamber 7 by a pipe 16.

The heated, and by heat reception, compressed air contained in the chamber 7 will then flow from chamber 7 to the air turbine 15 and in this engine at least a portion of the energy is converted into mechanical energy. The exhaust air however from this turbine flows through the conduit 2 to the combustion space 1, where it is used as combustion air for the fuel entering at 3.

Figure 2:
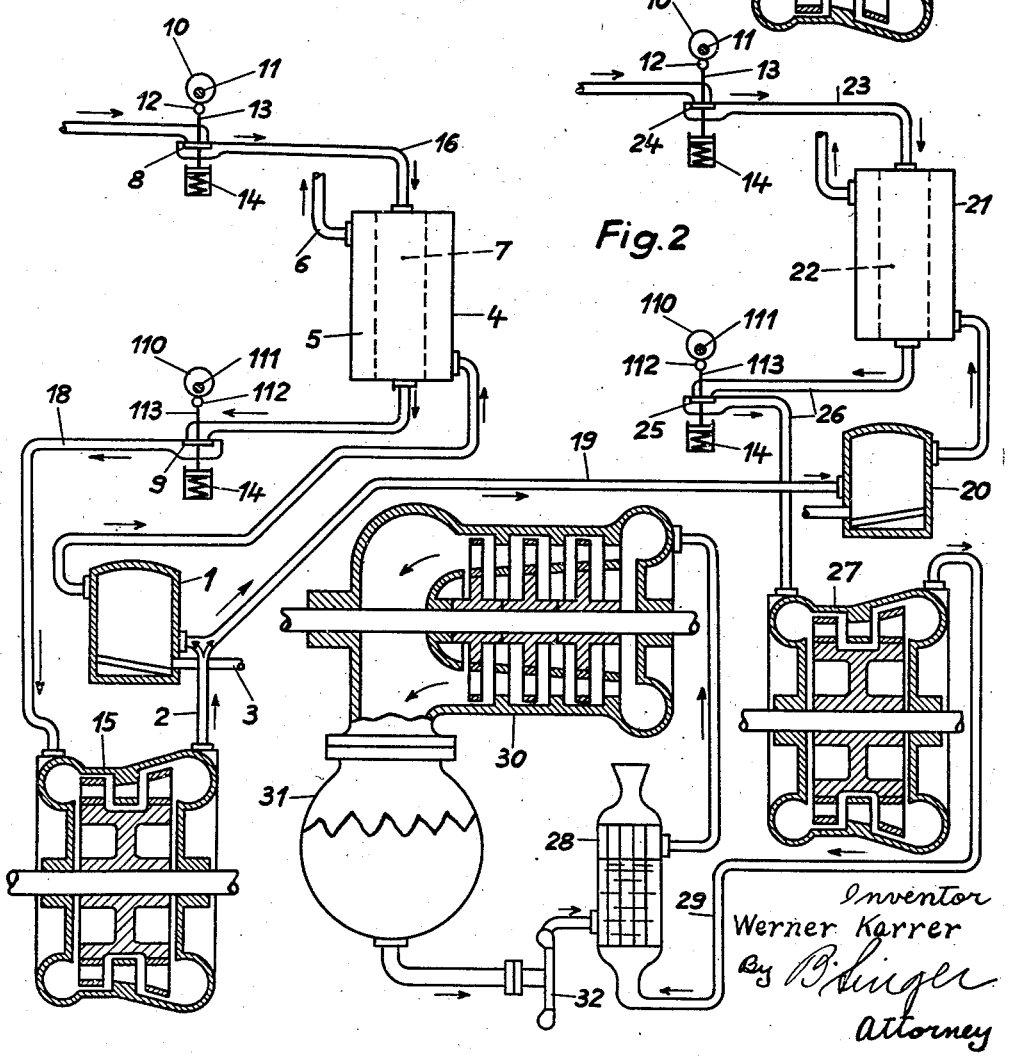
Fig. 2 is a view, largely diagrammatic and partly in section, of a second embodiment of the invention.

In Fig. 2 a more elaborate plant is shown. This plant comprises the parts described with reference to Fig. 1 and in addition thereto other engines to perform work. Of all the exhaust air leaving the air turbine 15 only a part is used to sustain the combustion and is returned to the combustion chamber 1 by pipe 2. The gases of combustion passing through the heat exchanger 4 transmit heat to the motive medium in the chamber 7 and escape as waste gases into the atmosphere by pipe 6. In the chamber 7 the air is introduced intermittently by valve 8 arranged in the pipe 16 and is heated while the volume is kept constant or nearly so (as described with reference to Fig. 1). When a certain predetermined pressure is attained, valve 9 opens and the working medium passes to the air turbine 15, where work is done by expansion.

A portion of the exhaust air of the air turbine 15 is used as air for combustion and is led by a pipe 19 into the combustion space 20. The gases of combustion transmit, by means of the exchanger 21, heat to the air which is within the chamber 22. The volume of the air so heated is kept constant. Air is introduced into chamber 22 intermittently and by means of the pipe 23. The filling and emptying of chamber 22 is controlled by the valves 24 and 25, similar to the valves 8 and 9 controlling chamber 7 as shown with respect to Fig. 1. The air is led by a pipe 26 to expand in the air turbine 27 after a certain pressure has been attained owing to the heating of the air in the chamber 22 by keeping the volume constant or nearly so. The remaining heat of the air, escaping from the air turbine 27 may be further made use of, for instance in the steam boiler 28 of any known construction, to which the air is led by a conduit 29. The steam generated therein is used to feed a steam turbine 30. The steam passes through a condenser 31 and the condensed steam is returned to the boiler by the pump 32.

Instead of air any other heat carrier may be used in the first described part of the plant comprising the elements 1, 7, 15. If the heat carrier is not a combustible gas the heat remaining in the motive medium after the first rotary engine would have to be absorbed by air or by any other combustible gas. Such a method would reduce the efficiency and would make the plant more costly.

In all the following examples the intermittent filling and emptying of chamber 7 may be controlled by valves 8 and 9 as shown in Fig. 1.

The plant shown in Fig. 3 comprises a combustion chamber 1 in which the air of combustion and the fuel are introduced by pipes 2 and 3 respectively. The gases of combustion pass on to the heat exchanger 4. The gases transmit heat to the air within the chamber 7 which air previously has been compressed from the initial pressure $P_0$ to the pressure $P_1$ by a compressor 32. The potential energy of the gases escaping from the heat exchanger by the pipe 6 is converted in the gas turbine 33 into mechanical work. The compressed air inclosed in the chamber 7 is heated at a constant volume. The pressure of the air thereby increases, say, to $P_2$. The motive medium is fed intermittently into the air turbine 15 by a pipe 18. Expansion takes place in the said turbine, the drop equals $P_2$ to $P_1$. Part of the exhaust air of the air turbine 15 is used as air for combustion in the combustion chamber 1. Part thereof passes directly into the continuous current air turbine 34, in which the energy of the compressed air is converted into work. The remaining air escapes through the exhaust pipe 35 into the atmosphere.

Exhaust gases and exhaust air which have a temperature exceeding that of the atmosphere may be used to transmit heat for any purpose.

Fig. 4 illustrates still another use of the exhaust air passing from the rotary engine and which is not used for combustion purposes. Moreover it shows a modified construction of the gas turbine.

Fresh air is compressed by the compressor 32 from initial pressure $P_0$ to the pressure $P_1$ and fed to the chamber 7. The compressed air passes intermittently (as shown with respect to Fig. 1) on to the chamber 7 of the heat exchanger 4 through a conduit 16. Heat is transmitted to said air in the heat exchanger, the air being kept at a constant volume. The pressure rises up to $P_2$. The compressed and heated air passes now intermittently as described with respect to Fig. 1 to the air turbine 15 through a pipe 18. One part of the exhaust air of the turbine 15 is used for combustion purposes in the combustion chamber 1 to which fuel is fed by a pipe 3. The resulting combustion gases pass to the chamber 5' of the heat exchanger 4 and transmit part of their heat to the compressed fresh air in the chamber 7, which air is heated under constant volume. The products of combustion escape from the chamber 5' of the heat exchanger 4 and are introduced in the mixing chamber 36 by a pipe 37. They are mixed here with the residual exhaust of the air turbine 15 and the mixture being a gas with a high surplus of air is passed on through conduit 39 to the gas turbine 38. The pressure is therein reduced from $P_1$ to $P_0$ by expansion, work being done in the gas turbine 38. The exhaust of the gas turbine 38 transmits a further portion of the heat in the chamber 5 of the heat exchanger 4 to the compressed air in the constant volume chamber 7. Chamber 7 is intermittently filled and emptied by means of the valves 8 and 9 in the same manner as described with respect to Fig. 1. The exhaust gases pass through pipe 6 into the atmosphere, or they may be used for any other purposes.

Fig. 5 shows another embodiment of my invention wherein the air is compressed by a compressor 40 from the initial pressure $P_0$ to the pressure $P_1$, fed to the chamber 7 of the heat exchanger 4 by means of a pipe 16 and a valve 8. The heated medium leaves chamber 7 as soon as it has attained a predetermined pressure by a conduit 18 and valve 9 and is fed to an air turbine 15. The exhaust gases are fed by a pipe 41 to a continuous current turbine 42 arranged directly behind the air turbine 15. In the continuous current turbine 42 the difference in pressure ($P_1$—$P_0$) is converted into mechanical work. A part of the exhaust gases of the turbine 42 is led into the combustion chamber 1 by a conduit 2 from which the heated gases are fed into the chamber 5 of the heat exchanger 4. Fuel is fed to the combustion chamber 1 by a pipe 3. The other part of the exhaust gases of the turbine 42 is led into the atmosphere by conduit 43. The plant is otherwise similar to those described above.

Figure 7:
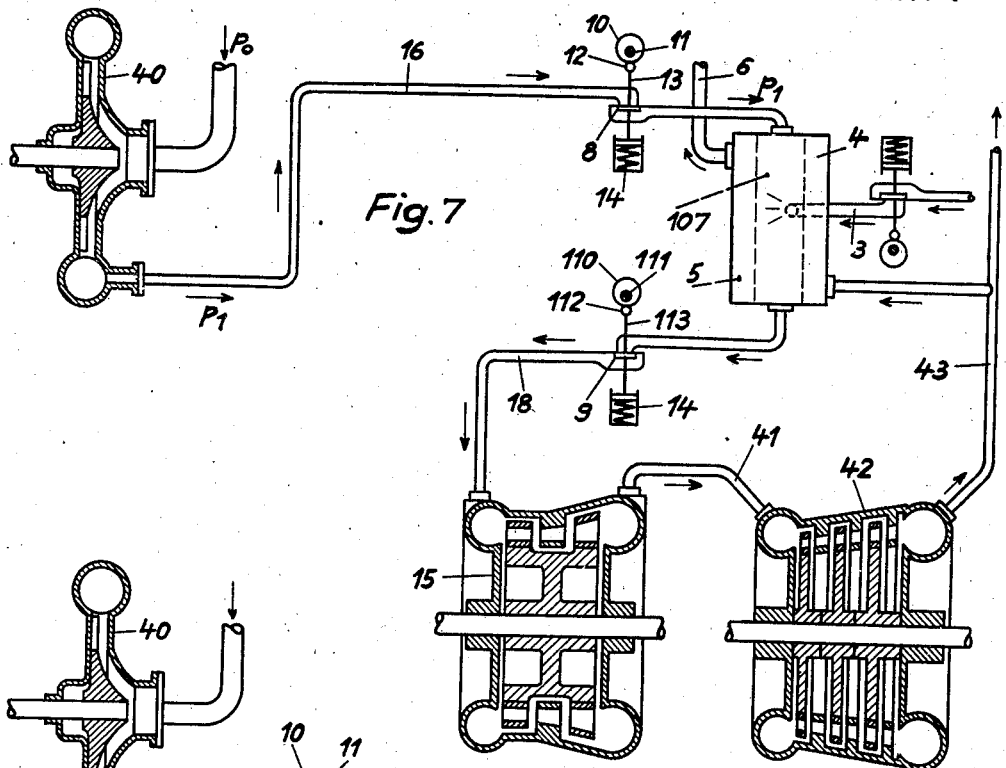
Fig. 7 is a view, similar to Figs. 1, 2, 3, 4, 5, 6, of a seventh embodiment of the invention.
Figure 8:
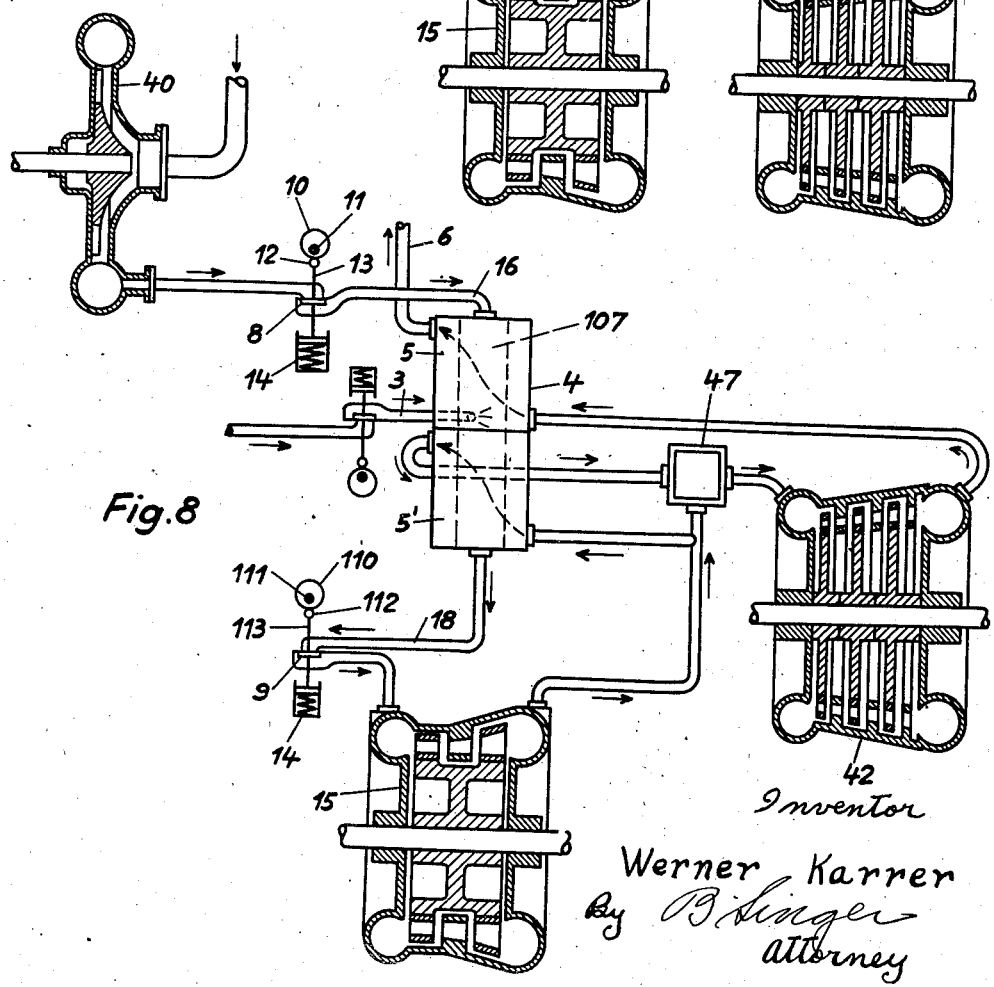
Fig. 8 is a view, similar to Figs. 1, 2, 3, 4, 5, 6, 7, of an eighth modification of the invention.

Figs. 6, 7 and 8 show embodiments in which the combustion also takes place at constant volume after the heat has been absorbed at constant volume by heat exchange.

In the plant shown in Fig. 6, 107 denotes the combustion chamber arranged in the space between the valves 8 and 9 of the heat exchanger 4. Fresh air is drawn through the conduit 16 into the chamber 107. The filling of the chamber 107 is controlled by the valve 8, as described in Fig. 1. In the chamber 107 the air is heated at constant volume by a part of the exhaust gases of the rotary engine 15 and its pressure is brought up to $P_1$, owing to the absorption of heat at constant volume. Fuel is introduced into the space 107 by the pipe 3 and this fuel is ignited. Owing to the combustion, pressure and temperature may be further increased while the volume remains constant. After attaining a predetermined pressure, for instance a pressure $P_3$, valve 9 opens and the space 107 is evacuated into the turbine 15, where these gases now expand and thereby do mechanical work. The pressure is reduced through this conversion into mechanical energy to the value $P_0$. Part of the exhaust gases pass into the chamber 5 of the heat exchanger 4 and transmit heat to the fresh air and escape by pipe 6 into the atmosphere or else to any other place, where they may be used for any desired purpose. Another part of the exhaust gases escaping through pipe 44 may be utilized for any other purpose.

The control of the intermittent filling and emptying of the chamber 107 is effected by the valves 8 and 9, in the same manner as described in Fig. 1. The illustrated control of the valves 8 and 9 should, of course, be regarded merely as an example, as any desired number of solutions can be imagined by which the number of the switchings of the present invention may be carried into effect.

In Figs. 7 and 8 a similar control is shown, for example, so that it need not be described once more.

Fig. 7 illustrates a modified construction of the plant. Fresh air of the pressure $P_0$ is passed through the compressor 40. The pressure is thereby increased to $P_1$. In the chamber 107 of the heat exchanger 4 the air is brought up to the pressure $P_2$ owing to the absorption of heat from the exhaust gases of the rotary engine 42. Fuel is introduced by pipe 3. Combustion takes place, the constant volume is maintained all the time. The pressure in chamber 107 is further increased to $P_3$. The gases of combustion are brought to work in the intermittently working gas turbine 15. Expansion takes place until the pressure is about $P_1$. The gases pass on to the continuously working gas turbine 42 where a further expansion takes place. The pressure falls to $P_0$. Part of the exhaust gases from the gas turbine 42 is returned to the heat exchanger 4 which they leave by the pipe 6 to pass into the atmosphere. A further part flows off through pipe 43 and may be used for any other purposes. This plant is quite similar to that described with respect to Fig. 5, the difference residing only in another arrangement of the combustion chamber.

Fig. 8 shows another connection of the continuous current gas turbine 42. Part of the exhaust gases of the gas turbine 15 passing through chamber 5' of the heat exchanger 4 transmit their heat partly to the air in the chamber 107, which is heated at constant volume as described in Fig. 1. The pressure in 107 rises owing to the heating by exchange at constant volume. After the exchange has been terminated, the fuel is injected through the conduits 3 and is then ignited. Owing to the combustion at constant volume, the pressure in 107 rises still more until the valve 9 opens and the combustion gases of the turbine 15 flowing through the space 5' leave the exchanger 4 after having passed through the space 47 in order to be intermingled with the balance of the exhaust gases of the turbine 15.

The mixture passes on to the gas turbine 42 to utilize the pressure drop $P_1 - P_0$. The gases are finally returned to the heat exchange 4 to transmit at least a part of the residual heat to the chamber 5 and pass off finally into the atmosphere.

In all the different embodiments of my invention the chambers of the heat exchanger are alternately filled and emptied. Between the filling and emptying periods the exchange of heat takes place and in some cases the combustion.

What I wish to claim is:

1. A method of converting heat into mechanical power, which method consists in heating a power medium located in a closed chamber for the purpose of increasing the pressure of the medium by heat exchange; intermittently filling said chamber with power medium, discharging the same each time a predetermined pressure has been reached, effecting the discharge at least partially by conducting power medium from said chamber into at least one rotary power engine and therein converting, at least in part, the pressure energy inherent in the power medium into mechanical energy; increasing the heat of the power medium and utilizing at least a part of the exhaust heat of the power engine by conducting the exhaust to the outside of said closed chamber and there transferring its heat by heat exchange to the power medium in said closed chamber.

2. The method of claim 1 wherein the power medium is air, the method further consisting in adding a combustible substance to the air in said closed chamber before admitting the mixture to the power engine.

3. In a method as defined in claim 1, in which a combustible gas is utilised as the motive medium, using at least a part of the exhaust combustible gas of the rotary engine as fuel, especially to produce at least part of that heat which is transmitted to the medium in the closed chamber by an exchange of heat.

4. The method according to claim 1, characterized in that, after the working medium has obtained by absorption, heat under constant volume through heat exchange from the outside, a certain temperature and a certain corresponding pressure, there is started a combustion and thereafter the gases are caused to expand, at least, partly in at least one power machine.

5. In a method as defined in claim 1, the step of a preliminary mechanical compression of the motive medium and in utilising the pressure-drop due to said compression in a rotary engine to convert the energy to mechanical work.

6. In a method as defined in claim 1, in which part of the exhaust air of the rotary engine not used in combustion is mixed with the combustion gases and passed into a second rotary power engine.

WERNER KARRER.